W. C. STEVENS.
MOTOR CONTROLLER.
APPLICATION FILED JUNE 1, 1909.
995,730.
Patented June 20, 1911.
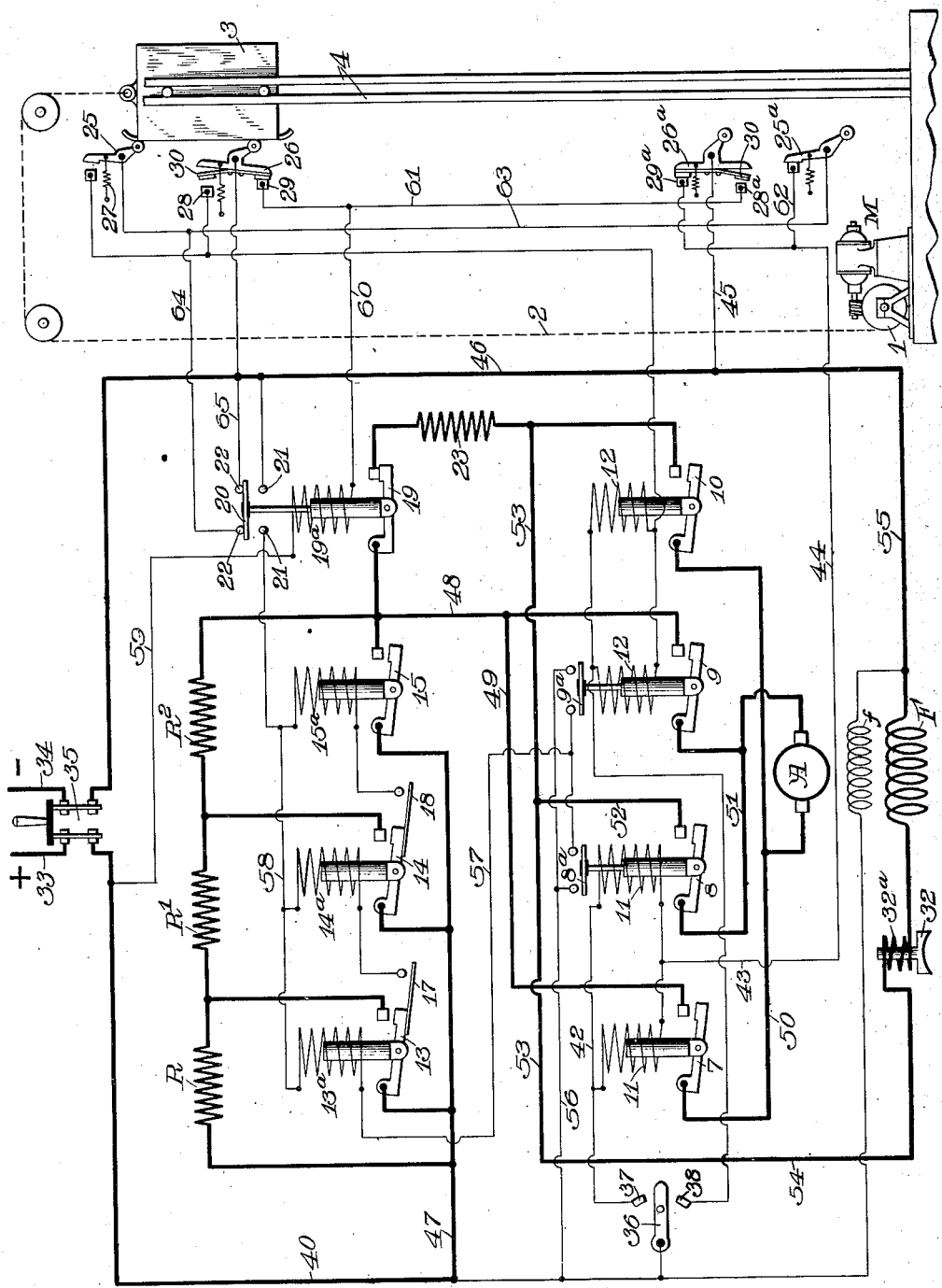
WITNESSES,
George Haynes
J. W. Fitzgerald
INVENTOR,
William C. Stevens.
BY Edwin B. H. Tower, Jr.
ATTY.

UNITED STATES PATENT OFFICE.

WILLIAM C. STEVENS, OF PITTSBURG, PENNSYLVANIA, ASSIGNOR TO THE CUTLER-HAMMER MFG. CO., OF MILWAUKEE, WISCONSIN, A CORPORATION OF WISCONSIN.

MOTOR-CONTROLLER.

995,730.

Specification of Letters Patent. Patented June 20, 1911.

Application filed June 1, 1909. Serial No. 499,403.

*To all whom it may concern:*

Be it known that I, WILLIAM C. STEVENS, a citizen of the United States, residing at Pittsburg, in the county of Allegheny and State of Pennsylvania, have invented new and useful Improvements in Motor-Controllers, of which the following is a full, clear, concise, and exact description, reference being had to the accompanying drawing, forming a part of this specification.

My invention relates to improvements in motor controllers and more particularly to controllers for automatically slowing down and stopping electric motors. Such controllers are used in many instances and are particularly useful where it is desired to stop the mechanism operated by the motor in predetermined positions. In controllers used for this purpose, the slow down mechanism is usually set in operation before the motor circuit is opened, and its operation is so timed that when the motor circuit is finally opened, the motor will be brought to rest within a predetermined time. It will thus be apparent that if the slow down mechanism fails to operate from any cause, the motor will continue to operate at full speed until its circuit is opened, with the result that the inertia of the driven mechanism will cause the operation of the motor to be unduly prolonged after its circuit is opened. Hence, the motor will fail to stop the driven mechanism in the proper position. Failure of the slow down mechanism to operate is very likely to cause disastrous results to the driven mechanism. For instance, where such controllers are depended upon to automatically stop an elevator at the limits of its travel, failure of the slow down mechanism to operate is very likely to result in the complete destruction of the car and serious damage to its shaft.

My invention, therefore, has for its object to provide means for automatically disconnecting the motor from circuit immediately upon failure of the slow down mechanism to operate. I also preferably provide a mechanical brake for the motor arranged to be applied immediately upon the opening of the motor circuit. With this arrangement, a sufficient length of time is insured in which to bring the motor to rest without the aid of the slow down mechanism, and, hence, all damage arising from failure of the slow down mechanism to operate is obviated.

For the purpose of more fully disclosing the characteristic features of my invention, I shall describe the controller which is illustrated diagrammatically in the accompanying drawing. The drawing merely illustrates the general principles of my invention and simply shows diagrammatically one form in which it may be embodied. I have made no attempt, in the drawing, to illustrate all of the apparatus which would be used in my controller in practice, but have eliminated many devices that would be used, so as to simplify the illustration and description of my invention. It should be understood that my invention may be used in various other relations, and that it is capable of various modifications. The drawing should, therefore, be constructed in an illustrative sense and not in a limiting manner.

The controller illustrated is provided for controlling a motor M, arranged to operate a hoisting drum 1. The hoisting drum 1 is connected by suitable cable 2 to a suitable hoist 3. For the purpose of illustration, I have shown suitable guides 4—4 for the hoist. The motor may be of any preferred type. As diagrammatically illustrated in the drawing, the motor M is provided with an armature A, a series field winding F and a shunt field winding $f$. For controlling the direction of the flow of current through the motor armature, I have shown reversing switches 7, 8, 9 and 10 which are arranged in pairs. The switches 7 and 8 are each provided with an operating winding 11, which windings are connected in parallel. The switches 9 and 10 are each provided with an operating winding 12, which windings are also connected in parallel. The switches 8 and 9 are arranged to operate auxiliary switches $8^a$ and $9^a$ respectively. Arranged in the circuit of the motor are resistances R $R^1$ and $R^2$, which are controlled by switches 13, 14 and 15. The switches 13, 14 and 15 are provided with operating windings $13^a$, $14^a$ and $15^a$ respectively. The switches 13 and 14 are provided with auxiliary contacts 17 and 18 respectively, each adapted to engage a stationary contact for the purpose hereinafter set forth. In addition to the switches mentioned, I provide another switch 19, the purpose of which will be hereinafter more fully set forth. The switch 19 is provided with an operating winding $19^a$. The core of the winding $19^a$ is provided with a tail rod which carries a contact disk 20 adapted, when the switch 19 is open, to engage a pair of contacts 21, and, when the switch 19 is closed, to engage a pair of contacts 22. A resistance 23 is provided in circuit with the switch 19 for the purpose hereinafter set forth.

Arranged in the path of the hoist 3 and adapted to be actuated thereby, as the same approaches the limits of its travel, are suitable limit switches. I prefer to provide two of these limit switches to be actuated at each limit of the hoist. For the purpose of distinction, I will designate the switches at the upper limit as 25 and 26, and the switches at the lower limit as $25^a$ and $26^a$. The switches 25 and $25^a$ are each arranged to engage a single contact and are normally held in engagement therewith by any suitable means, such as springs 27. The switches 26 and $26^a$ are adapted, when in one position, to engage contacts 28 and $29^a$ respectively, and, when in another position, to engage contacts 29 and $28^a$ respectively. Suitable means, such as springs, are provided for normally holding the switches 26 and $26^a$ in engagement with the contacts 28 and $29^a$ respectively. In order that the switches 26 and $26^a$, when operated, may engage one contact before leaving the other contact, I preferably provide the same with yielding contact pieces 30. Each of the switches 25, 26, $25^a$ and $26^a$ is provided with a roller, or any other suitable means, adapted to engage by the hoist 3 to actuate the same. The limit switches are so arranged that the switches 26 and $26^a$ will be operated prior to the operation of the switches 25 and $25^a$.

In practice, I preferably provide a suitable mechanical brake 32, adapted to be applied to the motor or to one of the driven parts. In practice, I also prefer to have the mechanical brake applied automatically upon disconnecting the motor from circuit. To accomplish this result, I may provide a coil $32^a$, arranged in the motor circuit for withdrawing the brake. The winding $32^a$ would be deënergized upon the opening of the motor circuit, thereby causing the mechanical brake to be immediately applied. Of course, this result might be accomplished in various other ways.

Current is supplied to the motor and to the operating windings of the various switches from main lines 33 and 34 through a double pole switch 35. For initially controlling the circuits of the operating windings of the various switches, I have shown a master switch 36, which may be located on the car and adapted to be moved into engagement with either the contact 37 or 38. Of course, in practice, the switch 36 may assume any preferred form.

I shall now describe the operation of the controller, assuming that the hoist 3 is in the position illustrated, thereby maintaining the switches 25 and 26 in the position shown. In this position, switch 26 completes the circuit of the winding $19^a$, thereby maintaining the switch 19 in closed position. Under these conditions, in order to start a motor, it is necessary to throw the switch 36 into engagement with the contact 37. This closes a circuit from main line 33, through switch 35 by conductors 40 and 41, through the switch 36 and contact 37, by conductor 42, through the windings 11 of the switches 7 and 8 in parallel, by conductors 43 and 44, to contact $29^a$ of switch $26^a$, through switch $26^a$ by conductors 45 and 46 to the opposite side of the main line. This causes the energization of the windings 11, which, in turn, close the switches 7 and 8. This completes the motor circuit from conductor 40, by conductor 47, through the resistances R, R' and $R^2$, by conductors 48 and 49, through the switch 7, by conductor 50, through the motor armature A, by conductor 51, through the switch 8, by conductors 52, 53 and 54, through the brake coil $32^a$ and series field winding F, by conductor 55 to conductor 46, and thence to the opposite side of the main line. The circuit for the shunt field winding $f$ extends from conductor 41 through the winding $f$ to conductor 55. The brake coil 32 now being energized, withdraws the mechanical brake, thereby allowing the motor to start with all of the starting resistance in circuit. The motor being thus started, causes the hoist 3 to descend, with the result that the limit switch 25 is first released, and then the limit switch 26 is released. Upon the release of the switch 26, the circuit of the winding $19^a$ is opened, with the result that the switch 19 opens and the switch 20 engages contacts 21. Upon the occurrence of these conditions, circuit is closed from conductor 41 by conductor 56 through the switch $8^a$ by conductor 57, through the winding $13^a$ of the resistance switch 13, by conductor 58, across switch 20 to conductor 46. This causes the energization of the winding $13^a$, which closes the switch 13, thereby removing the resistance R from the motor circuit. Closure of the switch 13 causes the auxiliary switch 17, operated thereby, to complete the circuit of the winding $14^a$. This circuit may be traced from conductor 47 through the switch 13, contact 17, through the winding $14^a$ to conductor 58. The switch 14 then closes, thereby removing the resistance R' from the motor circuit. Closure of the switch 14 in turn completes the circuit of the winding $15^a$, which causes the switch 15 to close, thereby removing resistance $R^2$ from the motor circuit. The motor is thus brought up to normal speed. As the hoist approaches the lower limit of its travel, it first engages the limit switch $26^a$, thereby disengaging the same from the contact $29^a$ and causing the same to engage contact 28ª. As before stated, the switch 26ª is adapted to engage the contact 28ª before it leaves the contact 29ª. Immediately upon engaging the contact 28ª, circuit is closed from conductor 40 by conductor 59, through the winding 19ª by conductors 60 and 61 to contact 28ª, thence through the switch 26ª by conductor 45 to conductor 46. This causes energization of the winding 19ª, which, in turn, closes the switch 19, and causes the switch 20 to engage the contacts 22. Upon leaving the contact 29ª, the switch 26ª interrupts the circuit of the windings 11, and said windings would then become deënergized, but for the fact that the closure of the switch 20 completes a maintaining circuit therefor from conductor 44 by conductor 62, through the limit switch 25ª, by conductors 63 and 64, through the switch 20 by conductor 65 to conductor 46. Hence, if the switch 19 responds upon the operation of the switch 26ª, a maintaining circuit will be established for the windings of the reversing switches through limit switch 25ª. On the other hand, if the switch 19 fails to operate from any cause whatever upon the operation of the limit switch 26ª, the circuit of the windings 11 will be opened, thereby releasing the switches 7 and 8. The switches 7 and 8 would then open, thereby interrupting the motor circuit, and deënergizing the brake coil 32ª. The mechanical brake would then be immediately applied, thereby bringing the motor to rest in a short time. If the switch 19 does respond, it opens the circuits of the windings of the resistance switches at contacts 21, thereby causing said switches to open successively to reinsert the starting resistances in circuit to gradually slow down the motor. Closure of the switch 19 also completes a dynamic braking circuit across the terminals of the motor armature. This circuit may be traced from one terminal of the motor armature by conductor 51 through switch 8, by conductors 52 and 53, through the resistance 23, across switch 19, by conductors 48 and 49, through the switch 7, by conductor 50 to the other terminal of the motor armature. Further downward movement of the hoist opens the switch 25ª, which causes deënergization of the windings of the reversing switches 7 and 8, thereby entirely disconnecting the motor from the supply circuit and deënergizing the brake coil 32ª. By this time, the motor has been slowed down to a low speed and the application of the mechanical brake quickly brings the motor to a standstill.

From the foregoing, it will be seen that if the switch 19 fails to respond, or opens after being once closed, the maintaining circuit of the windings of the reversing switches would immediately be opened, thereby causing the motor to be disconnected from circuit, and causing the mechanical brake to be immediately applied. This arrangement insures the stopping of the motor in ample time to avoid danger, even though the slow down mechanism fails to operate.

To operate the car in the opposite direction, the switch 36 should be thrown into engagement with contact 38. This would cause the energization of the windings of the reversing switches 9 and 10, which would then close, thereby causing current to flow through the motor circuit in an opposite direction to that previously described. The remaining operation of the controller would be substantially like that already described, inasmuch as the limit switch 26 performs the same functions as the switch 26ª, and the switch 25 performs the same functions as the switch 25ª.

I claim—

1. In a controller for electric motors, in combination, automatic means for slowing down the motor, and means for automatically disconnecting the motor from circuit upon failure of said first mentioned means to operate.

2. In a controller for electric motors, in combination, means for automatically slowing down the motor, and means for automatically disconnecting the motor from circuit and causing the application of a mechanical brake upon failure of said first mentioned means to operate.

3. In a controller for electric motors, in combination, a plurality of automatic means for slowing down the motor, and means for automatically disconnecting the motor from circuit upon failure of said first mentioned means to operate.

4. In a controller for stopping electric motors, in combination, automatic means for controlling the motor circuit, automatic means for slowing down the motor, and a controller for both of said means arranged to cause the said second mentioned means to operate, and to cause said first mentioned means to immediately disconnect the motor from circuit upon failure of said second mentioned means to operate.

5. In a controller for stopping electric motors, in combination, automatic means for controlling the motor circuit, automatic means for slowing down the motor, a controller for both of said means arranged to cause the said second mentioned means to operate, and to cause said first mentioned means to immediately disconnect the motor from circuit upon failure of said second mentioned means to operate, and an automatically controlled mechanical brake arranged to be applied when the motor is disconnected from circuit.

6. In a controller for stopping electric motors, in combination, automatic means for controlling the motor circuit, automatic means for slowing down the motor, a controller adapted to be actuated to cause said second mentioned means to operate, and tending, at the same time, to cause said first mentioned means to disconnect the motor from circuit, and means for rendering said controller ineffective to cause the motor to be disconnected from circuit if said second mentioned means operates.

7. In a controller for stopping electric motors, in combination, automatic means for controlling the motor circuit, automatic means for slowing down the motor, a controller adapted to be actuated to cause said second mentioned means to operate, and tending, at the same time, to cause said first mentioned means to disconnect the motor from circuit, means for rendering said controller ineffective, to cause the motor to be disconnected from circuit if said second mentioned means operates, and an electromagnetically controlled mechanical brake arranged to be applied when the motor is disconnected from circuit.

8. In a controller for electric motors, in combination, electromagnetic means for controlling the motor circuit, electromagnetic means for slowing down the motor, a controller adapted, when actuated, to cause the operation of said second mentioned means, and to cause the deënergization of said first mentioned means, and means for automatically establishing a maintaining circuit for said first mentioned means upon the operation of said second mentioned means.

9. In a controller for stopping electric motors, in combination, electromagnetic means for controlling the motor circuit, electromagnetic means for slowing down the motor, a switch tending to stand in position to maintain said first mentioned means energized and adapted to be actuated to cause the energization of said second mentioned means and the deënergization of said first mentioned means, and means for automatically establishing a maintaining circuit for said first mentioned means upon the operation of said second mentioned means.

10. In a controller for stopping electric motors, in combination, electromagnetic means for controlling the motor circuit, electromagnetic means for slowing down the motor, and a limit switch adapted to be automatically operated to cause the operation of said second mentioned means, and to cause said first mentioned means to disconnect the motor from circuit upon failure of said second mentioned means to operate.

11. In a controller for stopping electric motors, in combination, electromagnetic means for controlling the motor circuit, electromagnetic means for slowing down the motor, a limit switch adapted to be automatically operated to cause the operation of said second mentioned means, and to cause said first mentioned means to disconnect the motor from circuit upon failure of said second mentioned means to operate, and an electromagnetically controlled mechanical brake arranged to be applied upon disconnecting the motor from circuit.

12. In a controller for stopping electric motors, in combination, electromagnetic means for controlling the motor circuit, electromagnetic means for slowing down the motor, a limit switch adapted to be automatically operated to cause the operation of said second mentioned means, and to cause said first mentioned means to disconnect the motor from circuit upon failure of said second mentioned means to operate, and another limit switch adapted to be automatically actuated to cause said first mentioned means to disconnect the motor from circuit after the same has been slowed down.

13. In a controller for stopping electric motors, in combination, electromagnetic means for controlling the motor circuit, electromagnetic means for slowing down the motor, a limit switch adapted to be automatically operated to cause the operation of said second mentioned means, and tending, at the same time, to cause the deënergization of said first mentioned means, means for establishing a maintaining circuit for said first mentioned means upon the operation of said second mentioned means, and another limit switch arranged to be automatically operated at a predetermined time, to open the maintaining circuit for said first mentioned means, to disconnect the motor from circuit.

14. In a controller for electric motors, in combination, automatic means for starting and accelerating the motor, automatic means for slowing down the motor, and a limit switch arranged to cause the operation of said slow down means, and to cause the motor to be immediately disconnected from circuit upon failure of the slow down means to operate.

15. In a controller for electric motors, in combination, automatic means for starting and accelerating the motor, automatic means for slowing down the motor, a limit switch arranged to cause the operation of said slow down means, and to cause the motor to be immediately disconnected from circuit upon failure of the slow down means to operate, and an automatically controlled mechanical brake adapted to be applied upon disconnecting the motor from circuit.

16. In a controller for electric motors, in combination, electromagnetically operated switches for starting, accelerating and slowing down the motor, and a plurality of limit switches, certain of said limit switches being arranged to cause certain of said electromagnetic switches to operate to slow down the motor, and to cause other of said switches to disconnect the motor from circuit upon failure of the slow down switches to operate, and other of said limit switches being arranged to cause the motor to be disconnected from circuit after the same has been slowed down.

17. In a controller for electric motors, in combination, electromagnetically operated switches for starting, accelerating and slowing down the motor, a plurality of limit switches, certain of said limit switches being arranged to cause certain of said electromagnetic switches to operate to slow down the motor, and to cause other of said switches to disconnect the motor from circuit upon failure of the slow down switches to operate, and other of said limit switches being arranged to cause the motor to be disconnected from circuit after the same has been slowed down, and an electromagnetically controlled mechanical brake adapted to be applied upon disconnecting the motor from circuit.

In witness whereof, I have hereunto subscribed my name in the presence of two witnesses.

WILLIAM C. STEVENS.

Witnesses:
EDWARD T. FOOTE,
FRANK H. HUBBARD.